Patented Jan. 19, 1943

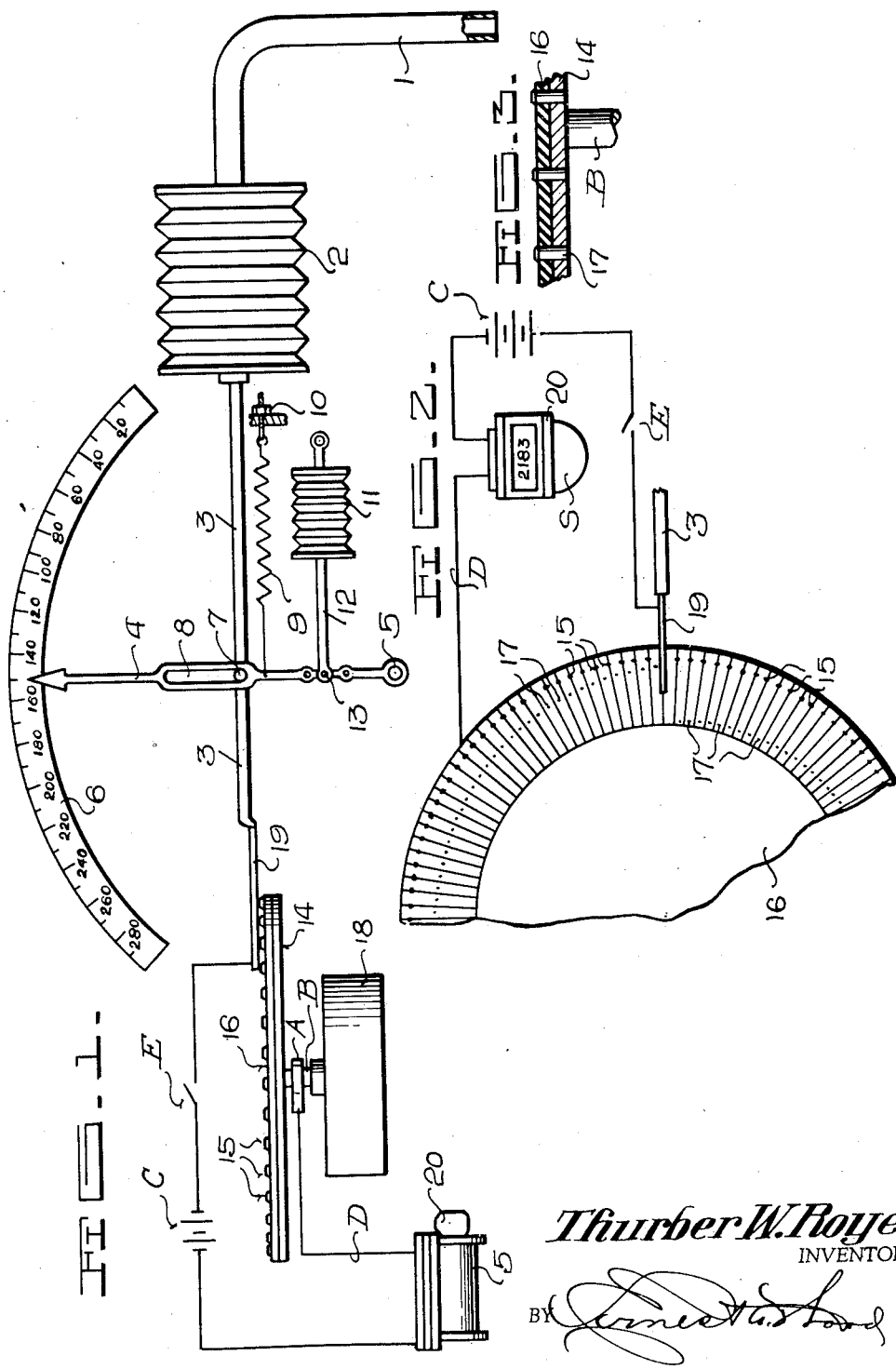

2,309,015

UNITED STATES PATENT OFFICE 2,309,015

AIR MILEAGE REGISTER FOR AIRCRAFT

Thurber W. Royer, Dallas, Tex.

Application May 2, 1940, Serial No. 332,899

2 Claims. (Cl. 73—183)

This invention relates to aeronautical instruments and it has particular reference to an air mileage odometer for airplanes.

Another object of the invention is to provide means of integrating time with speed to obtain an indication of air miles traversed by an airplane.

Another object of the invention resides in the provision of means by which air miles traversed are measured in direct relation to speed and time.

Other objects and advantages of the invention will become manifest as the description proceeds, taken in connection with the accompanying drawing, wherein:

Figure 1 is a schematic view of the invention.

Figure 2 is a plan view of the time controlled disc and its electrical relationship with the mileage indicating mechanism.

Figure 3 is a fragmentary detail view, partly in section, showing the construction of the disc.

Continuing with a more detailed description of the drawing, reference is primarily made to Figure 1 in which is shown the speed indicating mechanism which constitutes in part the elements of the present invention. This mechanism is comprised of the conventional air speed indicator Pitot tube 1, which is directed into the air stream of the airplane and communicates with the bellows 2. As the velocity of air flow past the Pitot tube increases with increased speed of the airplane, the bellows 2 expands and in so doing, moves the arm 3 against the pointer 4, the latter being pivoted at 5. The pointer moves over a calibrated segment 6, on which is borne numerals indicative of miles per hour. While any suitable connection between the arm 3 and pointer 4 may be employed, a pin 7 is shown affixed to the arm, which enters an elongated slot 8 in the pointer in order to accommodate the differential movement. A spring 9 counteracts the urge of the bellows 2 and returns the pointer 4 to its original position when moved as described. An adjustment 10 is afforded through the medium of which the tension of the spring may be varied for minute adjustment.

Associated with the elements just described is a bellows 11, somewhat smaller than the bellows 2 and which is provided with an arm 12, pivoted at 13 to the pointer arm 4. The purpose of this bellows is to provide means to compensate for diminishing atmospheric pressure and density as higher altitudes are attained by the ship. Ordinarily, the bellows 11 which has no inherent resiliency would be sealed at the predetermined air pressure of 14.7 pounds per square inch corresponding to sea level pressure, when the bellows are slightly past their fully extended position as installed in the instrument. As higher altitudes and consequently rarified atmosphere are reached, the bellows attempts to expand in ratio to the diminishing atmospheric pressure, hence exerting a correspondingly greater force on the pointer arm 4, moving the latter to higher graduations on the scale 6. Thus, as the density-altitude of the ship is increased, the decrease of atmospheric pressure would cause the speedometer needle to be moved proportionally to indicate the higher speed.

To compute the number of air miles traversed, a disc 14, shown fragmentarily in Figure 2, is provided, having a multiplicity of contacts 15, insulated one from another by means of a mat of non-conductive material 16. These contacts 16 are equi-distantly spaced about the edge of the disc while a second series of identical contacts 17 are spirally arranged on the disc from the perimeter inwardly toward the center thereof, as shown in Figure 2. The purpose of these contacts will be presently described.

The disc 14 is rotated at a predetermined rate of speed by means of a clock mechanism 18. Speed of rotation is in relation to the number of contacts carried by the disc 14 but it is preferred that the disc be revolved at the rate of 1 R. P. H. for reasons to become apparent presently.

Connected to and moved longitudinally by the bellows arm 3 is a brush 19. This brush is so arranged that it will be constrained to move toward the center of the disc 14 as the speed of the ship is increased and being so acutated, it is contacted successively by the points 15 along the edge of the disc. The variables of the system, such as the tension on spring 9, are so arranged that the points 15 are first contacted by the brush 19 when the air speed of the plane reaches the minimum cruising speed, say, sixty M. P. H.

In order to provide current to the disc contacts 15 and 17, a collar A surrounds the shaft B of the disc and carries a contact brush by which current is supplied from battery C through solenoid S of the odometer and through wire D. The circuit is completed through the brush 19 moving over the contact points 15 and 17. A switch E is arranged in the circuit, as shown.

At this speed, sixty contacts are made by the brush 19 with the points 15 each time the disc is rotated, which occurs once each hour, as explained. When each impulse is thereby made, the odometer 20 registers one mile and in the course of one revolution, which occurs in one hour, the odometer will have registered 60 times, indicating 60 miles, which is the distance that the plane has traveled in one hour at a speed of 60 M. P. H.

Assume the speed to be increased for the next hour to 61 M. P. H. 61 contacts will have been made during the course of the hour since the 60 contacts 15 have contacted brush 19 as well as the outermost of the series of spirally arranged contacts 17. The odometer will have registered 61 times representing 61 miles, the air miles traversed during the hour. As the speed of the airplane is further increased, the brush 19 is still further advanced toward the center of the disc 14, thereby picking up additional contacts which will cause the odometer to register the increased number of miles traversed in a given period of time.

Obviously, such variables as the minimum cruising speed of the plane, the speed of rotation of the disc 14, the number of contacts on the disc, the spacings on the scale 6, and the strength of the spring 9, etc., may be varied over a wide range, provided that the average M. P. H., multiplied by the time in hours, is accurately computed by the odometer 20.

Manifestly, the construction as shown and described is capable of some modification and such modification as may be construed within the scope and meaning of the appended claims is also considered to be within the spirit and intent of the invention.

What is claimed is:

1. An air mileage indicator for aircraft including an expansible air pressure responsive means, an electric circuit, a clock actuated disc disposed in said circuit carrying a multiplicity of closely associated and spirally arranged electrical contacts, an electro-magnetic counter also in said circuit, and means actuated by the expanding and contracting movements of said air pressure responsive means and engageable with the contacts of said clock actuated disc to open and close said circuit in accordance with the varying speeds of said aircraft, to actuate said counter.

2. An air mileage indicator for aircraft including an expansible air pressure responsive means, an electrical circuit, an electro-magnetic counter arranged in and actuated by said circuit, a disc arranged to rotate at a predetermined rate of speed, a spirally arranged series of closely associated electrical contacts in said circuit, on said disc and separately insulated, and means actuated by said pressure responsive means and cooperating with said electrical contacts for translating electrical impulses effected by said contacts on said circuit into miles to be computed by said magnetic counter.

THURBER W. ROYER.